United States Patent [19]
Howard

[11] Patent Number: 4,654,577
[45] Date of Patent: Mar. 31, 1987

[54] PERMANENT MAGNET ROTARY ELECTRICAL MACHINES

[75] Inventor: John R. Howard, Dunstable, England

[73] Assignee: Lucas Industries, England

[21] Appl. No.: 798,185

[22] Filed: Nov. 14, 1985

[30] Foreign Application Priority Data

Nov. 28, 1984 [GB] United Kingdom ............... 8429974

[51] Int. Cl.$^4$ ..................... H02P 9/00; H02K 21/00
[52] U.S. Cl. ..................................... 322/28; 322/29;
322/51; 322/52; 310/112; 310/114
[58] Field of Search .................... 322/28, 29, 51, 52;
310/112, 114

[56] References Cited

U.S. PATENT DOCUMENTS

| 3,713,015 | 1/1973 | Frister | 322/28 |
| 4,229,689 | 10/1980 | Nickoladze | 310/112 X |
| 4,278,928 | 7/1981 | Griffiths et al. | 322/29 |

FOREIGN PATENT DOCUMENTS 0058025 8/1982 European Pat. Off. .

Primary Examiner—Patrick R. Salce
Assistant Examiner—Mark D. Simpson
Attorney, Agent, or Firm—Andrus, Sceales, Starke & Sawall

[57] ABSTRACT

A permanent magnet rotary electric machine has two permanent magnet rotors rotatable within respective stator windings, and drivingly connected to an input shaft. The driving connection to one of the rotors is provided by an epicyclic gear train to which the input shaft is coupled. A second input to the gear train is provided by a gear carrier which is angularly movable about the input shaft axis by an actuator which is responsive to a difference between a desired and sensed operating condition of the machine, as for example desired and sensed values of output voltage when the machine is a generator.

3 Claims, 1 Drawing Figure

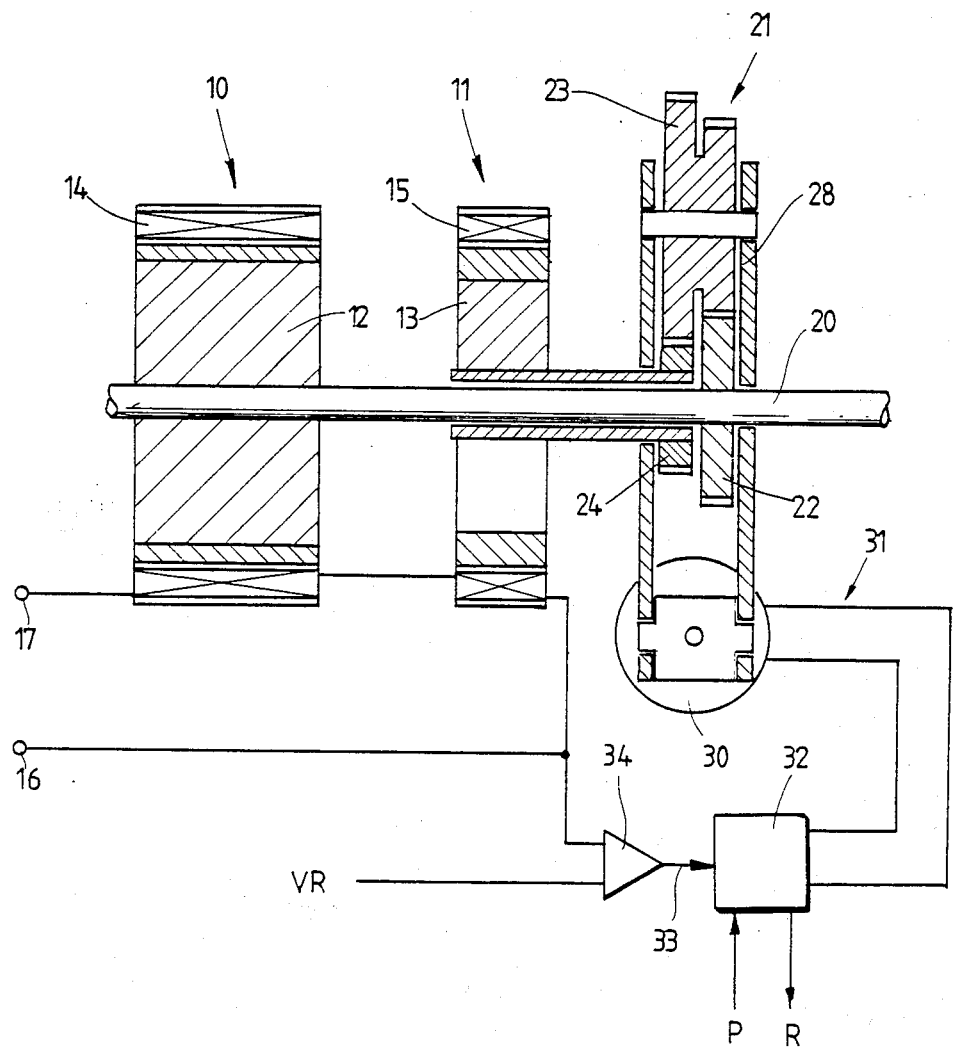

PERMANENT MAGNET ROTARY ELECTRICAL MACHINES

This invention relates to rotary electrical machines, having permanent magnet rotors.

It is known to provide rotary electrical machines having permanent magnet rotors. In a generator the use of such rotors gives rise to difficulties in regulating the output voltage under varying conditions of external load and shaft speed. In a motor there are corresponding difficulties in regulating the output speed. It has been proposed to provide regulation as aforesaid by providing two rotor parts and varying the relative angular positions of these parts. An electric machine having means for providing relative rotation between permanent magnet rotor parts is disclosed in U.S. Pat. No. 3713015.

It is necessary that the aforesaid relative rotation is carried out while the machine is in operation, and the rotor may therefore be turning at a high speed. The force required to effect relative rotation corresponds to the resulting change in the input or output power of the machine, and may therefore be considerable. It is therefore necessary to effect such relative rotation by means of a power actuator. In U.S. Pat. No. 3713015 a linear actuator is coupled to one rotor part by means of an axially sliding collar which engages skew splines on a shaft of the rotor part. It is a disadvantage of such an arrangement that where the machine input or output is high the helix angle of the splines must also be high to avoid unacceptable friction forces between the collar and the splined shaft. However, in order to effect full control of the machine output it is necessary to relatively rotate the rotor part over an angle of 360°/n, where n is the number of poles on the rotor part. Thus, where the number of poles is small a substantial amount of relative angular movement of the rotor part is required and if the helix angle of the skew splines is made sufficiently high as to prevent undue friction, the axial length of the spline part must be very large to effect the required relative rotation.

European Pat. No. 0058025 discloses a generator arrangement in which relative rotation between permanent magnet rotors may be effected by driving one of the rotors through a first epicyclic gear train which has one of its input elements relatively fixed, and driving the other rotor through a second epicyclic gear train in which one of the input elements is angularly movable, relative to a fixed part of the generator, by an actuator which is responsive to a difference between a sensed and a desired operating condition. Permanent magnet generators are commonly used in aircraft and it is therefore desirable to reduce weight and size of the apparatus as a whole. The present invention provides a permanent magnet electrical machine in which relative rotation between two rotors is effected by only one epicyclic gear arrangement.

According to the invention there is provided a permanent magnet rotary electrical machine including first and second stator windings, first and second permanent magnet rotors rotatable within said first and second stator windings respectively, an input drive shaft and first and second driving connections between said drive shaft and said second and first rotors respectively, said first driving connection being an epicyclic gear train having a first input element coupled to said drive shaft, a second input element angularly movable about the axis of said drive shaft in response to a difference between a desired and a sensed operating condition of said machine, and an output element coupled to said second rotor, said first driving connection comprising an input gear coupled to said shaft, an output gear coupled to said second rotor, and an intermediate gear element meshing with said input and output gears, said second input element comprising a carrier for said intermediate gear element.

An embodiment of the invention will now be described by way of example only and with reference to the accompanying drawing which shows, diagrammatically, a permanent magnet generator.

As shown in the drawing alternators 10, 11 have respective permanent magnet rotors 12, 13 and respective stator windings 14, 15. The stator windings 14, 15 are connected in series and an output voltage is obtained between terminals 16, 17. For the purpose of this description the terminal 17 may be regarded as being at earth potential.

An input drive shaft 20 is coupled directly to the rotor 12 and is coupled to the rotor 13 through an epicyclic gear train 21 which comprises a spur gear 22. a compound gear element 23 and a pinion 24 secured to the rotor 13. The arrangement is such that the rotor 13 is driven at twice the speed of the shaft 20. The axis of the compound gear element 23 is supported by a carrier 28 so as to be rotatable about the axis of the drive shaft 20. The carrier 28 is movable about the axis of the shaft 20 by a double acting piston and cylinder unit 30 which is mounted on a relatively fixed part of the arrangement and whose movable output element is secured to the carrier 28. Unit 30 is responsive to fluid pressures in lines 31 from an electro-hydraulic servo valve 32.

The valve 32 is of a well known type and does not form part of the present invention. Such valves are marketed by Moog Inc and an example of such a valve is described in U.S. Pat. No. 3228423. The valve 32 is responsive to the magnitude and sense of an electrical signal on a line 33 to apply a pressure signal P or a return pressure R selectively to the lines 31. The voltage at terminal 16 is the vector sum of the voltages from the alternators 10, 11 and is applied to a differential amplifier 34 for comparison with a reference voltage VR. In alternative embodiments the valve 32 may be made responsive to the speeds of the rotors 12, 13 or to both the voltage at terminal 16 and the rotor speeds.

The epicyclic gear train 21 is such that for each 1° of movement of the carrier 28 about the shaft 20, the rotor 13 is moved 1° in the opposite direction, relative to the rotor 12. In the particular example the rotor 12 has 8 poles and the rotor 13 has 4 poles, so that 45° movement of the carrier 28 will result in 180° change of phase of the output of the alternator 11. The carrier 28 is thus required only to move 22.5° either side of its centre position to control the total output voltage between zero and maximum.

The use of a 4 pole rotor 13 travelling at twice the speed of the rotor 12 has the effect that the rotor 13 may have reduced mass, thereby effecting a further weight saving.

I claim:

1. A permanent magnet rotary electrical machine including first and second stator windings, first and second permanent magnet rotors rotatable within said first and second stator windings respectively, an input drive shaft and first and second driving connections between said drive shaft and said second and first rotors respectively, said first driving connection being an epicyclic gear train having a first input element coupled to said drive shaft, a second input element angularly moveable about the axis of said drive shaft in response to a difference between a desired and a sensed operating condition of said machine, and an output element coupled to said second rotor, said first driving connection comprising an input gear coupled to said shaft, an output gear coupled to said second rotor, and an intermediate gear element meshing with said input and output gears, said second input element comprising a carrier for said intermediate gear element, said first driving connection having a gear ratio such that the speed of said second rotor is a whole number multiple of the speed of said first rotor.

2. A machine as claimed in claim 1 in which said first rotor is directly coupled to said input shaft.

3. A machine as claimed in claim 1 in which the ratio of the number of poles on said first rotor to those on said second rotor corresponds to said whole number of the speed of said first rotor.

* * * * *